United States Patent [19]
Damsky et al.

[11] 3,711,234
[45] Jan. 16, 1973

[54] AN APPARATUS FOR THE PRODUCTION OF PRECISION CASTINGS OR INJECTION-MOULDINGS FROM PLASTICS

[75] Inventors: Walter Damsky; Siegfried Joisten, both of Krefeld; Janos Sajben, Krefeld-Gartenstadt, all of Germany

[73] Assignee: Farbenfabriken Bayer Aktiengesellschaft, Leverkusen, Germany

[22] Filed: Nov. 9, 1970

[21] Appl. No.: 88,146

Related U.S. Application Data

[63] Continuation of Ser. No. 718,841, April 4, 1968, abandoned.

[30] Foreign Application Priority Data

April 19, 1967 Germany..............................F 52177

[52] U.S. Cl. ..................425/307, 264/161, 264/334
[51] Int. Cl................................................B29c 7/00
[58] Field of Search......264/161, 162, 163, 157, 158, 264/334, 336; 18/2 RP, 2 J, 4 R, 2 RM; 83/914; 72/344, 345; 425/306, 307, 313, 316, 308

[56] References Cited

UNITED STATES PATENTS

| | | | |
|---|---|---|---|
| 3,317,961 | 5/1967 | Drevalas et al. | 18/2 J X |
| 1,983,558 | 12/1934 | Morin et al. | 264/161 |
| 2,333,059 | 10/1943 | Tucker | 264/161 |
| 2,348,591 | 5/1944 | Bailey | 264/162 X |
| 2,739,349 | 3/1956 | Strauss | 18/2 RP X |
| 3,028,629 | 4/1962 | Focht et al. | 18/2 RM X |
| 3,121,919 | 2/1964 | Turner | 18/2 RN X |

Primary Examiner—Robert D. Baldwin
Assistant Examiner—Michael O. Sutton
Attorney—Burgess, Dinklage & Sprung

[57] ABSTRACT

Apparatus for production of an axially elongated plastic article of precise dimensions about its axially extending periphery. The article is first injection moulded in oversize form. It is then injected from the mould by an ejector which also advances the cast oversize article through a multistage cutting tool which cuts material from the periphery of the article to reduce it from the oversize condition to said precise dimensions.

15 Claims, 3 Drawing Figures

INVENTORS:
WALTER DAMSKY, SIEGFRIED JOISTEN, JANOS SAJBEN,

INVENTORS:
WALTER DAMSKY, SIEGFRIED JOISTEN, JANOS SAJBEN.
BY:
Burgess, Dinklage and Sprung
Attorneys

APPARATUS FOR THE PRODUCTION OF PRECISION CASTINGS OR INJECTION-MOULDINGS FROM PLASTICS

This application is in continuation of application Ser. No. 718,841, filed Apr. 4, 1968, and now abandoned.

This invention relates to a process and an apparatus of the production of precision castings or injection-mouldings from plastics, for example polyamides, acetal resins or polycarbonates.

It is generally known that finished parts can be produced fairly accurately in a single operation by casting, injection-moulding or compression-moulding without any need for machine finishing. When the parts are injection-moulded from plastics, however, considerable difficulties are encountered in regard to dimensional stability because serious shrinkage, affecting different portions of the part to different extents, occurs during the processing of plastics. This may be attributable, for example, to the manner in which the structure of the part is built up from the moulding material. Since the surface of plastics material is very quickly cooled, forming a skin, whilst the interior of the casting or injection-moulding is still soft, there is usually much greater thermal stress and uncontrollable distortion than affects metal castings, for example.

For example, precision components, such as plastics gearwheels which nowadays are used for a number of purposes, and above all in machine construction, and are produced by injection-moulding, do not run at all smoothly and are extremely noisy, with the inevitable result that they are extremely prone to premature wear. For example, it is not possible accurately and precisely to calculate the dimensions of the moulds used in the casting and injection-moulding of plastics components, with the result that the mould has to be subsequently corrected on the basis of finished specimens of injection-mouldings. The production of moulds of this kind naturally involves considerable time and expense, and is only justified when extremely large numbers of components are to be made. Even then, all the influential factors for example the injection conditions, and the homogeneity of the raw material, should remain permanently constant. Unfortunately, these requirements can never be effectively satisfied.

For the reason, the machine-finishing processes known in the metal industry have been adopted for the production of precision components, for example by subjecting precut or roughly performed components to machine forming by, for example, latheturning, planing, milling and shaping. In these machine operations, however, the workpiece has additionally to be fixed by hand on the cutting machine. Since machining involves a number of separate successive cuts, the amount of time involved in this operation is naturally very considerable. In addition, there is excessive wastage of material. On the other hand, a multi-stage cavity cutting tool for finishing precision-forged gearwheels is known from the literature, through which the preformed components are pushed by means of a ram for machine finishing. Unfortunately, cutting tools of this kind have never really been adopted in practice because the cutting elements are extremely difficult to produce.

Multi-stage cavity cutting tools of this kind have never been used in the production of precision components from plastics although plastics gearwheels have been in production for about 40 years now.

The invention provides apparatus for production of axially elongated plastic articles of precise dimensions about the axially extending periphery of the articles. The apparatus includes moulding means comprising a body portion and a closure plate for injection-moulding the plastic to make the article in oversize form with respect to and throughout the axially extending periphery. Also included is a multi-stage cutting tool axially alineable with the moulding means for cutting axially alineable with the moulding means for cutting material from the periphery of the oversize form to reduce the article from said oversize form to said precise dimensions. The moulding means further includes an axially movable particle ejector for axially moving the article from the moulding means and advancing the article through the cutting tool with the cutting tool axially aligned with the moulding means for cutting material from the periphery to reduce the article from said oversize form to the precise dimensions. The body portion of the moulding means is movable relative to the closure plate of the moulding means permitting opening and closing of the mould and permitting removable of the article from the moulding means by the ejector and advanced of the article through the cutting tool with the cutting tool axially aligned with the moulding means.

It has now been found that the disadvantages involved in the conventional manufacturing processes can be obviated, and a substantial advance in the production of precision castings or injection-mouldings from plastics, and hence a wider field of application, can be achieved by producing the castings or injection-mouldings oversize in rough-gauge moulds and forcing them through a multi-stage cavity-cutting tool in the same operation so that they can be machine finished.

According to another aspect of the invention, the castings or injection-mouldings are forced directly into and through the multi-stage cavity-cutting tool by the mould ejector.

In the apparatus for carrying out the process according to the invention the mould is followed by a multi-stage cavity-cutting tool, so that the casting or injection-moulding can be finished in a single operation. The multi-stage cavity-cutting tool is preferably built on to the mould or, in another embodiment of the invention, may be moved transversely into the ejecting direction of the mould. The mould ejector also acts with advantage as the pressure ram of the multi-stage cavity-cutting tool.

In a preferred embodiment of the invention, the individual cutting stages of the multi-stage cavity-cutting tool each comprise a cutting blade and a spacer member, whereas in conventional cutting stages a projection integral with the actual cutting element acts as the spacer member before the next cutting stage. The particular advantage of the division of the cutting stages according to the invention into a cutting blade and spacer member, is that the cutting blades themselves are much easier to produce because the narrower they are, the sharper the cutting edges can be made. The spacer member is preferably adapted as far as possible to the profile of the cutting edges of the cutting blade in order to support them. The cutting blades, and in some instances the spacers as well, have to be prevented from rotating to ensure that the successive cutting blades are not displaced or rotated relative to one another. The spacer rings are with advantage provided with openings to enable cuttings to be removed from the gaps between the cutting blades. The multi-stage cavity-cutting tool may be of course also be provided with a means for supply a coolant to it.

To enable machine finishing to be carried out on helically toothed gearwheels or similar injection-mouldings, the mould ejector is with advantage provided with a rotatably mounted disc so that the injection-moulding can be guided through the cutting stages. In order to ensure that the injection-moulding is correctly introduced, a centering means is provided in front of the first cutting blade of the multi-stage cavity-cutting tool. The multi-stage cavity-cutting tool described in the foregoing does not, however, necessarily have to be used in conjunction with the process according to the invention insofar as it embodies independent inventive design features and is also intended to enjoy protection as an independent device because it may also be used with advantage for machining non-plastics.

An embodiment of the apparatus is described by way of example in the following with reference to the accompanying drawings wherein.

Figure 1:
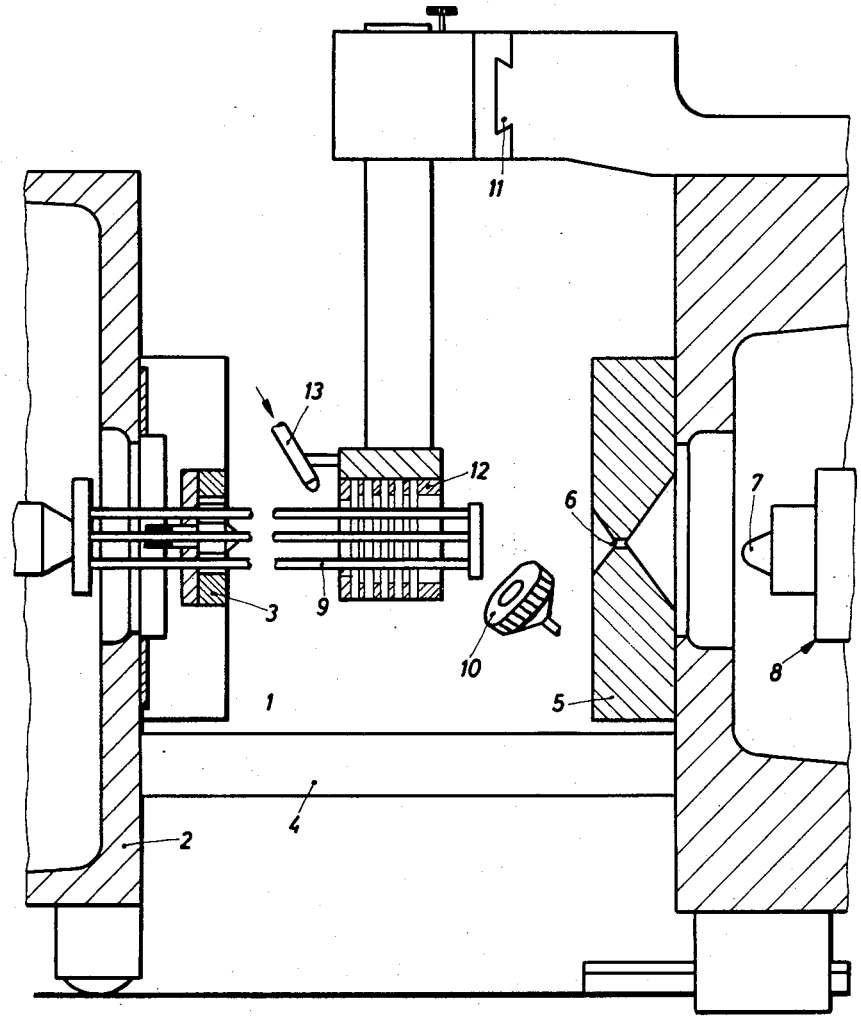
FIG. 1 is a partial section through the apparatus.

Referring now to the drawings, as shown in FIG. 1, a mould 1 is mounted on a travelling frame 2. A gearwheel mould 3 is inserted.

The frame 2 is moved along guides 4 towards a mould closure plate 5 provided with a gate 6. The nozzle 7 of an injection-moulding machine 8 (shown in outline only) is brought forward and the mould 1, 5 is filled. The frame 2 is then moved back again. An ejector 9 which, in its rest position, rests on the bottom of the mould insert 3 forces the thus formed injection-moulded gearwheel 10 out of the mould after a sufficiently long cooling period. Meanwhile, a multi-stage cavity-cutting tool 12, which travels along guide 11 has been moved into the path of the ejector 9 follows when it is activated, so that the ejector 9 is able to push the injection-moulding 10 through in a single operation. A coolant supply means is denoted by the reference 13.

Figure 2:
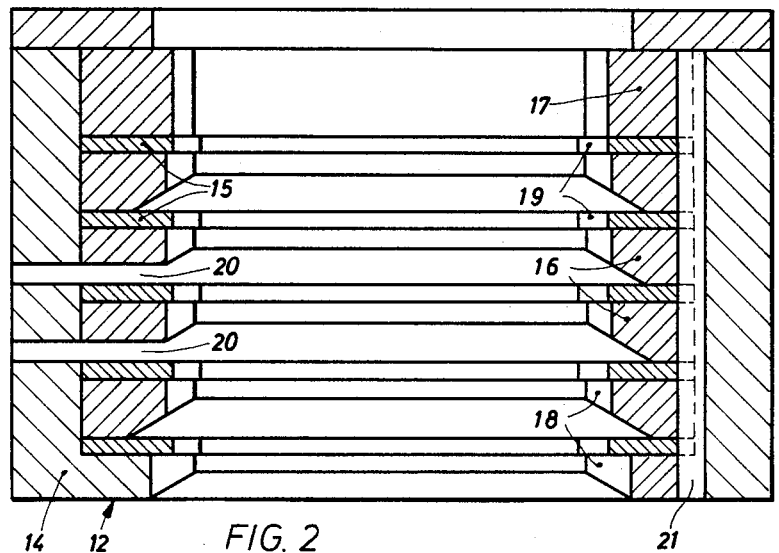
FIG. 2 is a section through the multi-stage cavity-cutting tool.

According to FIG. 2, the multi-stage cavity cutting tool consists of a housing 14, cutting blades 15, spacer members 16 and a centering piece 17. The spacer members 16 are provided with supporting profiles 18 for cutting edges 19, and with openings 20 through which cuttings are removed. Corresponding openings 30 are also provided in the housing 14. A feather key 21 prevents the cutting blades 15 and spacers 16 from rotating.

Figure 3:
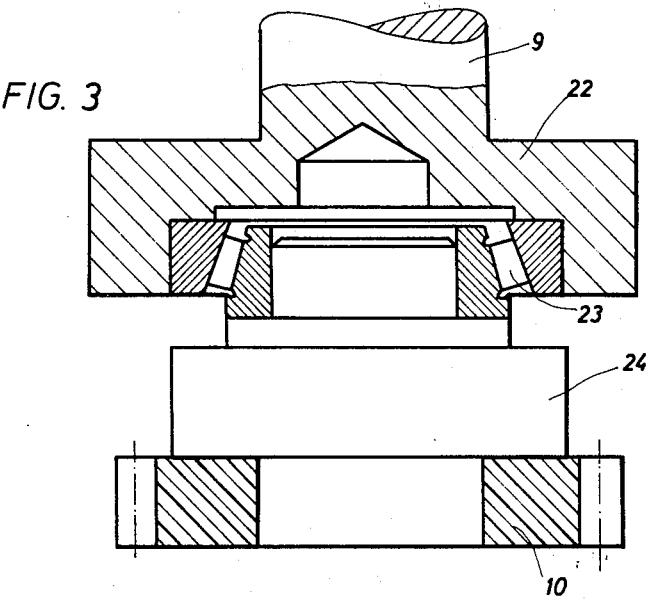
FIG. 3 shows the specially designed ejector.

As shown in FIG. 3, the end of the injector 9 is the form of a punch 22 which, by way of a roller bearing 23, carries a rotating disc 24 on to which the injection-moulding 10, which in this particular case consists of a helically toothed spurwheel, is mounted on the centering piece. The rotatable disc 24 enables the moulding to be machine finished in the multi-stage cavity-cutting tool 12.

What is claimed is:

1. Apparatus for production of an axially elongated plastic article of precise dimensions about its axially extending periphery which comprises:

a. moulding means comprising a body portion and a closure plate for injection-moulding the plastic to make said article in oversize form with respect to said axially extending periphery, b. a multi-stage tool axially alignable with the moulding means for cutting material from the periphery of the oversize form to reduce the article from said oversize form to said precise dimensions, c. said moulding means further comprising an axially movable article ejector for axially moving the article from the moulding means and advancing the article through said cutting tool with the cutting tool axially aligned with the moulding means for cutting material from the periphery to reduce the article from said oversize form to said precise dimensions, d. the body portion of the moulding means being movable relative to the closure plate of the moulding means for opening and closing of the mould and permitting removal of the article from the moulding means by said ejector and advance of the article through said cutting tool with the cutting tool axially aligned with the moulding means, e. said cutting tool being a multi-stage cavity-cutting tool comprising a housing in which several cutting stages are arranged one behind the other, the individual cutting stages each comprising a cutting blade having an inwardly disposed cutting edge and a spacer.

2. Apparatus according to claim 1, the moulding means closure plate being operatively connected to the nozzle of an injection moulding machine, the moulding means body portion being relatively axially movable toward and away from the closure plate for, respectively, closing the mould for the moulding and opening the mould for removal of the moulded article and advancing the article through said cutting tool.

3. Apparatus according to claim 2, the ejector being associated with the moulding means body portion and operable to axially remove the moulded article from the moulding means, with the moulding means in the open condition.

4. Apparatus according to claim 3, and a mounting means for the cutting tool, on which the cutting tool is movable to and from between the moulding means closure plate and body portion with the closure plate and body portion, respectively, in the open and closed condition, for said alignment of the cutting tool with the moulding means.

5. Apparatus according to claim 1, the ejector being associated with the moulding means body portion and operable to axially remove the moulded article from the moulding means, with the moulding means in the open condition.

6. Apparatus according to claim 5, and a mounting means for the cutting tool, on which the cutting tool is movable to and from between the moulding means closure plate and body portion with the closure plate and body portion, respectively, in the open and closed condition, for said alignment of the cutting tool with the moulding means.

7. Apparatus for production of an axially elongated plastic article of precise dimensions about its axially extending periphery which comprises:

a. moulding means comprising a body portion and a closure plate for injection-moulding the plastic to make said article in oversize form with respect to said axially extending periphery,
b. a multi-stage tool axially alignable with the moulding means for cutting material from the periphery of the oversize form to reduce the article from said oversize form to said precise dimensions,
c. said moulding means further comprising an axially movable article ejector for axially moving the article from the moulding means and advancing the article through said cutting tool with the cutting tool axially aligned with the moulding means for cutting material from the periphery to reduce the article from said oversize form to said precise dimensions, the ejector comprising a body member and a moulded article supporting member, the moulded article supporting member being mounted on the body member for free rotation of the article supporting member on the ejector body member for free rotation of the moulded article during passage through said cutting tool,
d. the body portion of the moulding means being movable relative to the closure plate of the moulding means for opening and closing of the mould and permitting removal of the article from the moulding means by said ejector and advance of the article through said cutting tool with the cutting tool axially aligned with the moulding means.

8. Apparatus according to claim 1, wherein each spacer of the cutting tool has a supporting profile for the cutting edge of its cutting blade.

9. Apparatus according to claim 1, and means for preventing the cutting tool cutting blades from rotating.

10. Apparatus according to claim 1, and means for preventing the cutting tool blades and spacers from rotating.

11. Apparatus according to claim 1, wherein the cutting tool spacers and the housing are provided with openings for discharge of material out from the moulded article.

12. Apparatus according to claim 1, and means for cooling the moulded article for said cutting thereof.

13. Apparatus according to claim 1, said cutting tool comprising means for centering the moulded article for the cutting thereof by the cutting tool.

14. Apparatus according to claim 1, the ejector comprising a body member and a moulded article supporting member, the moulded article supporting member being mounted on the body member for free rotation of the article supporting member on the ejector body member for free rotation of the moulded article during passage through said cutting tool.

15. Apparatus according to claim 1, said moulding means being for moulding the oversize form, oversize throughout the axial extending periphery thereof.

* * * * *